United States Patent
Porter et al.

(10) Patent No.: US 10,179,435 B2
(45) Date of Patent: Jan. 15, 2019

(54) ROOF DITCH MOLDING ASSEMBLY AND PROCESS WITH HEATED AIR ASSIST

(71) Applicant: U.S. Farathane Corporation, Auburn Hills, MI (US)

(72) Inventors: Steve Porter, Romeo, MI (US); Gerald N. Strich, North Branch, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 958 days.

(21) Appl. No.: 14/596,877

(22) Filed: Jan. 14, 2015

(65) Prior Publication Data
US 2015/0123316 A1 May 7, 2015

Related U.S. Application Data

(63) Continuation-in-part of application No. 14/075,654, filed on Nov. 8, 2013, now Pat. No. 8,955,896, which
(Continued)

(51) Int. Cl.
*B29C 51/08* (2006.01)
*B60R 13/04* (2006.01)
(Continued)

(52) U.S. Cl.
CPC .......... *B29C 51/082* (2013.01); *B29C 47/003* (2013.01); *B29C 47/0019* (2013.01); *B29C 47/0054* (2013.01); *B29C 47/0059* (2013.01); *B29C 47/8805* (2013.01); *B29C 47/90* (2013.01); *B29C 47/904* (2013.01); *B60R 13/04* (2013.01); *B29C 47/0035* (2013.01);
(Continued)

(58) Field of Classification Search
CPC ............................ B29C 67/0044; B29C 51/30
See application file for complete search history.

(56) References Cited

U.S. PATENT DOCUMENTS

| | | | |
|---|---|---|---|
| 3,490,113 | A | 1/1970 | Bulck |
| 4,411,613 | A | 10/1983 | Gauchel et al. |

(Continued)

FOREIGN PATENT DOCUMENTS

| | | |
|---|---|---|
| EP | 386986 A1 | 9/1990 |
| EP | 0430409 A2 | 6/1991 |

(Continued)

*Primary Examiner* — Galen H Hauth
(74) *Attorney, Agent, or Firm* — Dinsmore & Shohl LLP

(57) ABSTRACT

A method and assembly for reshaping an elongated plasticized article including a pair of first and second spaced apart fixtures adapted to supporting extending ends of an elongated article. The fixtures each exhibit a contoured upper surface upon which the elongated article is adapted to being supported in adhering fashion. A heated airflow is delivered in communication with at least one surface of the article and, upon cooling, the article exhibits an extending profile matching the contoured upper surface. A pre-heat station pre-softens at least an extending subset portion of the article prior to transfer to the fixture. Pluralities of gripping fingers communicate with an underside of the contoured upper surface and are adapted to engage at least underside accessible cross sectional profile locations of the article.

10 Claims, 13 Drawing Sheets

Related U.S. Application Data is a continuation-in-part of application No. 13/794,073, filed on Mar. 11, 2013, now Pat. No. 8,783,751.

(60) Provisional application No. 61/978,580, filed on Apr. 11, 2014, provisional application No. 61/669,732, filed on Jul. 10, 2012.

(51) Int. Cl.
| | | |
|---|---|---|
| *B29C 47/00* | (2006.01) | |
| *B29C 47/88* | (2006.01) | |
| *B29C 47/90* | (2006.01) | |
| *B29C 51/30* | (2006.01) | |
| *B29C 51/42* | (2006.01) | |
| *B29L 31/00* | (2006.01) | |
| *B29L 31/10* | (2006.01) | |
| *B29K 101/12* | (2006.01) | |
| *B29C 47/04* | (2006.01) | |

(52) U.S. Cl.
CPC .......... *B29C 47/0066* (2013.01); *B29C 47/04* (2013.01); *B29C 51/30* (2013.01); *B29C 51/424* (2013.01); *B29K 2101/12* (2013.01); *B29L 2031/001* (2013.01); *B29L 2031/003* (2013.01); *B29L 2031/108* (2013.01)

(56) References Cited

U.S. PATENT DOCUMENTS

| | | | |
|---|---|---|---|
| 5,013,083 A | 5/1991 | Yada et al. | |
| 5,026,477 A | 6/1991 | Yen | |
| 5,069,853 A | 12/1991 | Miller | |
| 5,108,681 A | 4/1992 | Cakmakci | |
| 5,167,891 A | 12/1992 | Dijkman, Sr. et al. | |
| 5,199,292 A | 4/1993 | Del Fabro et al. | |
| 5,205,885 A | 4/1993 | Schutz | |
| 5,240,751 A * | 8/1993 | Cakmakci | B29C 33/0055 428/192 |
| 5,368,903 A | 11/1994 | Trier | |
| 5,424,023 A | 6/1995 | Riley et al. | |
| 5,429,777 A | 7/1995 | Nilsson | |
| 6,210,615 B1 | 4/2001 | Yoshizuru et al. | |
| 6,224,145 B1 | 5/2001 | Sugiura | |
| 6,510,602 B2 | 1/2003 | Sugiura | |
| 6,684,574 B2 | 2/2004 | Hayashi | |
| 6,974,181 B2 | 12/2005 | Mikkaichi et al. | |
| 7,004,535 B1 | 2/2006 | Osterberg et al. | |
| 7,004,537 B2 | 2/2006 | Unger et al. | |
| 7,022,279 B2 | 4/2006 | Taillieu | |
| 7,029,060 B1 | 4/2006 | Osterberg et al. | |
| 7,045,189 B2 | 5/2006 | Hui et al. | |
| 7,069,760 B2 | 7/2006 | Jin | |
| 7,201,571 B2 | 4/2007 | Graefe et al. | |
| 7,401,395 B2 | 7/2008 | Unger et al. | |
| 7,531,118 B2 | 5/2009 | Ellis | |
| 7,604,287 B2 | 10/2009 | Mourou | |
| 7,621,574 B2 | 11/2009 | Mourou et al. | |
| 7,695,670 B2 | 4/2010 | Furuta et al. | |
| 7,815,830 B2 | 10/2010 | Ohlberg et al. | |
| 7,837,257 B2 | 11/2010 | Kuntze et al. | |
| 8,070,204 B2 | 12/2011 | Mourou | |
| 8,333,858 B2 * | 12/2012 | Rubin | B29C 70/504 156/200 |
| 2004/0156941 A1 * | 8/2004 | Miwa | B29C 43/36 425/406 |
| 2004/0201126 A1 | 10/2004 | Jakoby et al. | |
| 2006/0052538 A1 | 3/2006 | Ellul et al. | |
| 2007/0170614 A1 | 7/2007 | Ohlberg et al. | |
| 2007/0182214 A1 | 8/2007 | Okabe et al. | |
| 2008/0277973 A1 | 11/2008 | Mourou | |
| 2009/0021053 A1 | 1/2009 | Harberts et al. | |
| 2009/0102241 A1 | 4/2009 | Harberts et al. | |
| 2010/0180536 A1 | 7/2010 | Reznar | |
| 2010/0196629 A1 | 8/2010 | Mourou et al. | |
| 2011/0010898 A1 | 1/2011 | Scroggie et al. | |
| 2011/0204671 A1 | 8/2011 | Baratin | |
| 2012/0068488 A1 | 3/2012 | Mourou | |
| 2012/0291512 A1 * | 11/2012 | Kang | B21D 22/02 72/376 |
| 2012/0321734 A1 | 12/2012 | Kenny et al. | |
| 2013/0020737 A1 | 1/2013 | Ulcej | |
| 2013/0037986 A1 | 2/2013 | Graf | |
| 2013/0234474 A1 | 9/2013 | Coakley et al. | |
| 2013/0255349 A1 | 10/2013 | Lee et al. | |
| 2014/0062117 A1 | 3/2014 | Baxter et al. | |

FOREIGN PATENT DOCUMENTS

| | | |
|---|---|---|
| EP | 0857615 A1 | 8/1998 |
| JP | 09150683 A | 6/1997 |
| JP | 2003040042 A | 2/2003 |
| JP | 2003182466 A | 7/2003 |
| JP | 2007302171 A | 11/2007 |
| JP | 2010501384 A | 1/2010 |
| JP | 4722765 B2 | 7/2011 |

* cited by examiner

ROOF DITCH MOLDING ASSEMBLY AND PROCESS WITH HEATED AIR ASSIST

CROSS-REFERENCE TO RELATED APPLICATIONS

This application claims the benefit of U.S. Provisional Application 61/978,580 filed on Apr. 11, 2014. This application is a Continuation-in-part of application Ser. No. 14/075,654 filed on Nov. 8, 2013. Application Ser. No. 14/075,654 is a Continuation-in-part of application Ser. No. 13/794,073 filed on Mar. 11, 2013, now issued U.S. Pat. No. 8,873,751. Application Ser. No. 13/794,073 claims the benefit of U.S. Provisional Application 61/669,732 filed on Jul. 10, 2012, the contents of which are incorporated herein in their entirety.

FIELD OF THE INVENTION

The present inventions disclose both an assembly and process for assisting in final shaping an elongated and pre-extruded article, such as for application in one-limiting instance as an extending roof ditch molding. More specifically disclosed is any of one or more components directed to the above objectives and, among these including an optional pre-heat station for heating such as intermediate sections of the previously extruded article (further interpreted to include any single component extrusion or multi-component extrusion, the latter of which can exhibit components of varying plasticized composition and durometer ratings). Pre-heating of the intermediate sections can further be localized to regions short of the opposite ends, this in order to facilitate ease of operator handling as well as subsequent clipping to exact length of the finished bent article.

A main bending fixture exhibits a contoured surface against which the elongated article is clamped prior to heated air profiles being delivered from below and, optionally, also from above the extrusion, with any above originating heated air profile being directed downwardly and at a modified temperature which will avoid degrading any exposed decorative surface associated with the extruded article. Subset variants also contemplate such as the upper delivered (downwardly directed) heated air profile being introduced at an equivalent temperature as a corresponding underside (lower) delivered heated air profile, the upper profile capable of contacting a heat conducting shield or interposed template surface defining (and optionally heat conducting) article separating the air flow from the upper surface of the extruded article.

Following cooling of the (now shaped) part using ambient or cold forced air, any excess length of the finished product can be shortened by clipping the ends, such including the provision of knife end incising sub-assemblies built into the main bending fixture and which are aligned with desired end-points of the bent article which correspond to a desired overall length dimension. Incising or trimming end portions of the completed bent elongated article reflects the reality that the preceding bending and heating/cooling steps can impart variations to the overall length of the finished product, and which are best addressed by providing the initially formed extrusion at a slightly longer dimension and by simply clipping off any excess end materials associated with the completed bent article.

BACKGROUND OF THE INVENTION

The prior art is documented with examples of forming and shaping assemblies, such as in use with extruded or other pre-formed parts. A first example of this is depicted in Lee US 2013/0255349 which teaches a bending press system including at least one guide post. A slide plate is mounted at a slider so as to be slidable upwardly or downwardly along the guide post. A bending die including a lower die having an upper surface and an upper die having a lower surface corresponding to the upper surface of the lower die and mounted on a lower surface of the slide plate, and adapted to bend an object supplied between the lower die and the upper die to have a predetermined curvature; and a pair of clamping means mounted respectively at both sides of the bending die corresponding to the bending die and adapted to clamp both end portions of the object.

Riley, U.S. Pat. No. 5,424,023, teaches an apparatus and method for forming curved extruded products and which includes an extrusion apparatus, a method of making a curved extrusion, and a curved extrusion made by the method. The apparatus includes an extruder adapted to produce an extruded material having a cross-section. A plurality of guide members are arranged so as to form a curvilinear path through which the extrusion is passed, each of the guide members having an aperture having substantially the same shape as the cross-section of the extrusion. The plurality of guide members are adapted to form the extrusion into a curved shape, while maintaining the cross-section of the extrusion. A mechanical means is adapted to conduct the extrusion through the plurality of guide members, such as an extrusion puller.

Del Fabro, U.S. Pat. No. 5,199,292, teaches an assembly for bending bundles or rods in a position normal to a supporting bench and in four directions so as to produce any desired closed figure. Retaining means including grippers are provided and move vertically in guides for retracting downwards and which are included upstream and downstream of the bending assembly on substantially the same axis as the bundle of rods.

Ohlberg, U.S. Pat. No. 7,815,830, teaches a method for extruding curved extruded profiles. The extruded profile is formed in a matrix mounted upstream in a counter beam of an extruder system and is subsequently curved or bent due to the effect of external forces and separated, supported and arranged into partial lengths in the extrusion flow by means of a separating robot connected to a higher control mechanism and is discharged to a storage area with the aid of a handling robot. The handling robot is coupled to the separating robot by means of the control mechanism and, like the separating robot, is moved into a starting position in front of the extrusion press.

Other references of note include the method and device for forming a curved extruded article of Jakoby, US 2004/0201126, as well as the heat formed thermoplastic vulcanizate (TPV) co-extruded header trim of Ellis, U.S. Pat. No. 7,531,118. Other additional references include each of the apparatus for making curved plastic shapes, U.S. Pat. No. 3,490,113, the roof molding for an automobile of Sugiura, U.S. Pat. No. 6,510,602 and the handling system for curved extrusions of EP 0 430 409.

SUMMARY OF THE INVENTION

The present invention discloses an assembly for reshaping an elongated plasticized article and including a fixture exhibiting a contoured upper surface upon which the elongated article is adapted to being supported in adhering fashion to said contoured upper surface. A heated airflow is delivered in communication with at least one surface of the article for softening a given portion thereof and such that, upon subsequent cooling, the article exhibits an extending profile matching the contoured upper surface.

Additional features include the fixture including first and second spaced apart fixtures adapted to supporting extending ends of an elongated article. A pre-heat station can be provided for pre-softening at least an extending subset portion of the article prior to transfer to the fixture. Pluralities of gripping fingers can also be provided in communication with an underside of the contoured upper surface and which are adapted to engage at least underside accessible cross sectional profile locations of the article.

Other features include a top fixture supported in compressing fashion against the contoured upper surface of the fixture, such as associated with a main or lower supporting fixture, and with the elongated article sandwiched therebetween. This can include either or both of the heating or cooling assemblies incorporating a top sandwiching fixture for compressing the elongated article against a main lower supporting fixture. In each instance, the sandwiching fixtures defines an extending cavity within which is seated the article. Any arrangement of airflow passageways can be communicated through either or both of the fixtures onto the sandwiched article for communicating an airflow in a direction towards an upper surface of the article.

Other features include the top fixture exhibiting an article engaging contoured underside. A specific design configuration includes the top fixture incorporating downwardly directed airflow passageways for communicating a heated airflow in a direction towards an upper surface of the article. Other features include a further plurality of passageways formed through a base of the lower supporting fixture and communicating a heated airflow originating from a heat generating component into contact with at least an underside of the elongated article supported upon the contoured upper surface.

Other features include an ambient or cold airflow being applied from either of above or below the article. Also provided is at least one end cut fixture for sectioning an excess length of the cooled and reshaped article.

BRIEF DESCRIPTION OF THE DRAWINGS

Reference will now be made to the attached drawings, when read in combination with the following detailed descriptions, wherein like reference numerals refer to like parts throughout the several views, and in which.

DETAILED DESCRIPTION OF THE PREFERRED EMBODIMENTS

Figure 1:
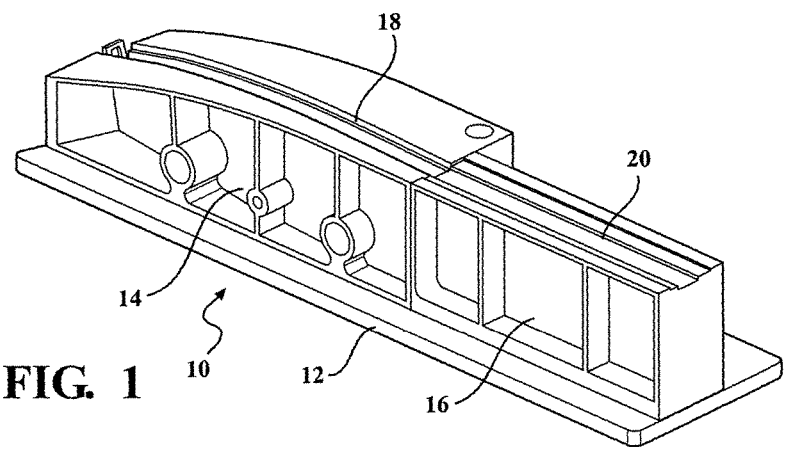
FIG. 1 is an illustration of a portion or wing of a supporting fixture according to one non-limiting configuration and including a contoured upper surface against which the previously extruded article held during bending re-forming into the desired completed profile.

With reference to the following description and illustration, the present inventions disclose both an assembly and process for assisting in final shaping an elongated and pre-extruded article, such as for application in one-limiting instance as an extending roof ditch molding. More specifically disclosed is any of one or more components directed to the above objectives and, among these including an optional pre-heat station for heating such as intermediate sections of the previously extruded article (further interpreted to include any single component extrusion or multi-component extrusion, the latter of which can exhibit components of varying plasticized composition and durometer ratings). As will be further described, an optional pre-heating of the intermediate sections can be performed, such as further being localized to regions short of the opposite ends, this in order to facilitate ease of operator handling as well as subsequent clipping to exact length of the finished bent article.

As will be further described, a main bending fixture is provided and, in specified variants, can include a single elongated fixture corresponding generally to the entire length of the elongated article (single or multi-component extrusion) to be formed. Alternatively, and as depicted in the present illustrations, the main fixture can be separated into a pair of wing or end extending fixtures for forming corresponding end portions of an elongated and typically extruded article supported in extending fashion upon the end located fixtures, with an intermediate (middle) extending portion of extrusion being supported in some fashion therebetween.

The main bending fixture exhibits a contoured surface against which the elongated article is clamped prior to heated air profiles being delivered from below and, optionally, also from above the extrusion, with any above originating heated air profile being directed downwardly and at a modified temperature which will avoid degrading any exposed decorative surface associated with the extruded article. Subset variants also contemplate such as the upper delivered (downwardly directed) heated air profile being introduced at an equivalent temperature as a corresponding underside (lower) delivered heated air profile, the upper profile capable of contacting a heat conducting shield or interposed template surface defining (and optionally heat conducting) article separating the air flow from the upper surface of the extruded article.

Following cooling of the (now shaped) part using ambient or cold forced air, any excess length of the finished product can be shortened by clipping the ends, such including the provision of knife end incising sub-assemblies built into the main bending fixture and which are aligned with desired end-points of the bent article which correspond to a desired overall length dimension. Incising or trimming end portions of the completed bent elongated article reflects the reality that the preceding bending and heating/cooling steps can impart variations to the overall length of the finished product, and which are best addressed by providing the initially formed extrusion at a slightly longer dimension and by simply clipping off any excess end materials associated with the completed bent article.

Figure 2:
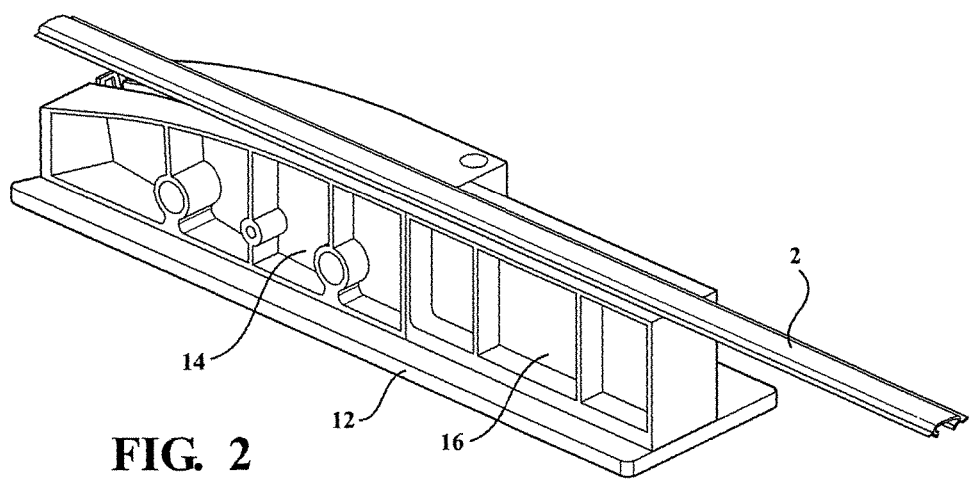
FIG. 2 is an illustration of a previously extruded and straight article being introduced upon the forming fixture of FIG. 1 at a un-heated state or with end locations pre-heated.
Figure 2A:
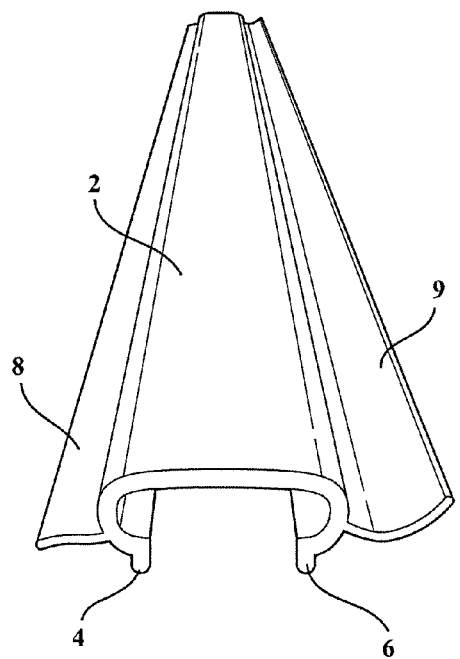
FIG. 2A is an end perspective of the article shown in FIG. 2 prior to application to the heating/reforming fixture, the article depicting by non-limiting example an elongated extrusion, such as associated with a roof ditch style molding application.

Proceeding from the above overview, and referring to the attached illustrations, FIG. 1 is an illustration generally at 10 of a portion or wing of a supporting fixture according to one non-limiting configuration for supporting an elongated extruded or other suitable plasticized or composite constructed article, further depicted at 2 in FIG. 2A. The elongated or strip like article 2 can exhibit any configuration and which, as previously described, can incorporate any single or multiple material extrusion (e.g. co-extruded or tri-extruded article) and, in the non-limiting example shown, is provided as an elongated molding for installation in a vehicle roof ditch.

Figure 4:
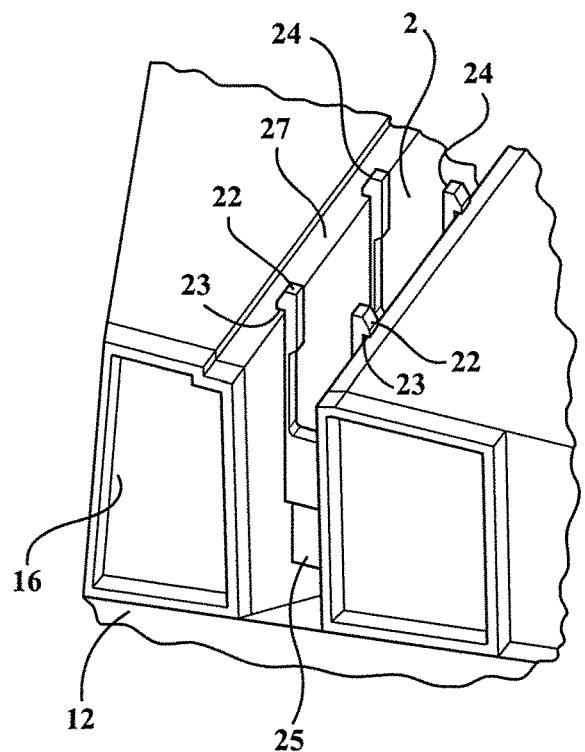
FIG. 4 is an underside illustration of a forming fixture such as depicted in FIGS. 1-2 and illustrating a plurality of gripping fingers which are configured to grip recessed underside accessible contours associated with the previously extruded article and to assist in conforming the article to the guiding/conforming upper surface of the fixture.

The elongated strip as best shown in FIG. 2A in end perspective and includes a typically decorative finished upper surface (again at 2), a modified underside accessible "C" channel including in part a pair of inwardly curled end portions 4 and 6, these facilitating gripping of the underside of the extrusion as further shown in FIG. 4 in addition to their putative application for providing an underside channel for seating mounting anchors associated with the normal roof ditch mounting application). The elongated article 2 also includes a pair of extending wings 8 and 9, these typically consisting of a softer durometer grade material in combination with a harder base durometer material forming the middle "C" channel configuration. Without limitation, the elongated article 2 can include additional materials (such as a third extruded slip coat) and it is envisioned that other plasticized based components, not limited to extrusions but possible including other generally elongated injection molded or other formed articles, can also be bent/reshaped utilizing the method and assembly of the present invention.

As shown, the exemplary main supporting fixture 10, in this instance again being a left side extrusion supporting fixture portion (also termed a jig portion) can be provided along with an identical right side fixture portion or jig (not shown). The fixture 10 illustrated includes a base supporting platform 12 which can be bolted or otherwise anchored to a ground surface, along with an upper extending superstructure, this further depicted by superstructure portions 14 and 16 which can be constructed of a suitable metal or like material. Although shown as distinct first and second portions, it is further understood that the fixture 10 can be constructed of a single or unitary component.

As further shown, the superstructure portions 14 and 16 (this also contemplating a single molded structure or any multiple of individual jig or fixture defining portions) can exhibit any upper surface profile (see aligning and contoured surfaces 18 and 20 and upon which the elongated article 2 is supported and conformed in a supported or seating and bent fashion). It is understood that the pattern or template defining surfaces 18 and 20 can extend in a multi-directional or multi-axial fashion in order to facilitate the reshaping of an article which provides the necessary profile for mounting in the eventual use application (e.g. such as a vehicle roof ditch in which the article mounts into an elongated ditch well which mimics the profile of the jig contoured surfaces).

As will also be described in reference to future variants, the elongated article or extrusion can include a pre-heating step by which any extending portion thereof, not limited to the ends or intermediate end locations, are heated to facilitate the re-forming or shaping of any part or all of the extending length of the article, this performed at a separate heating station (see also FIG. 13) and prior to the elongated article being introduced upon the main bending fixture (FIG. 2).

Figure 3:
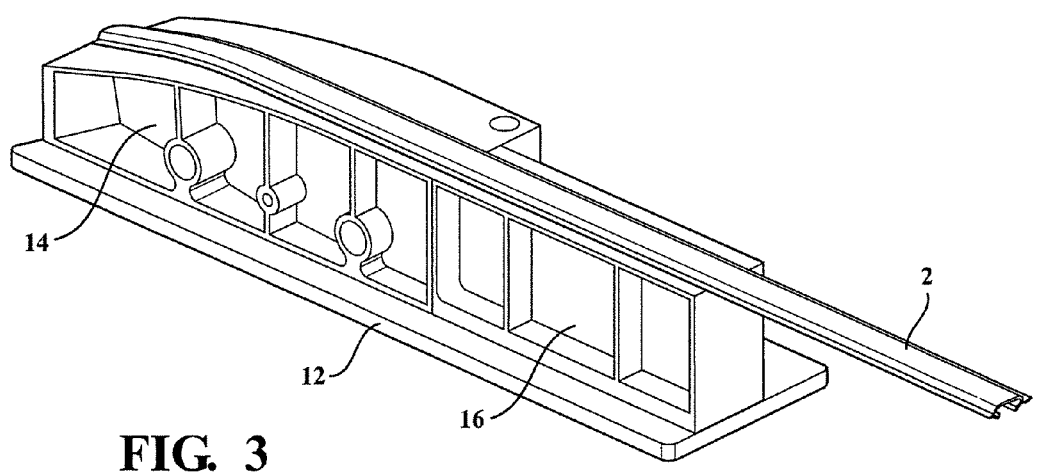
FIG. 3 is a succeeding illustration to FIG. 2 and showing the article in a conformed or bent condition upon the forming fixture.

FIG. 3 is a succeeding illustration to FIG. 2 and showing the extrusion in a conformed or bent condition upon the forming fixture 10, such resulting from a combination of heat and forcing of the article into contact with the contoured shaping surfaces 18 and 20 associated with the top of the superstructure 14/16. In one application, the ends of the extrusion can be held down against the fixture via clamps (see also operation view of FIGS. 16-17).

FIG. 4 is an underside illustration of a forming fixture such as depicted in FIGS. 1-3 and illustrating a plurality of paired gripping fingers 22 and 24 which are each configured in upwardly extending fashion from a manipulate-able base component (see at 25 in regards to finger pair 22). As shown, the gripping fingers are integrated into recessed locations of the channel defining or seating profile 18 and 20 and further such that outwardly turned underside ledges (see at 23 associated with upper outwardly facing ends of selected fingers 22) overlap a horizontally recessed support surface 27 in communication with the extending seating profile 18/20.

In this fashion, and upon the elongated article such as depicted at 2 being laid in or otherwise configured against the support surface, the gripping fingers are thus configured to grip recessed underside accessible contours associated with the previously extruded article 2 (see again "C" channel defined ends 4 and 6), while the outer extending edges of the article are supported upon the adjoining surfaces 27 of the support channel, and to thereby assist in conforming the article to the guiding/conforming upper surface of the fixture. Without limitation, the gripping fingers can be configured in a number of different ways and can exhibit any shape or profile, such also including the ability to be retracted (such as by an underside positioned actuating mechanism not shown but understood to manipulate the pairs of gripping fingers via their supporting base component 25, and following forming of the part profile to facilitate removal and reloading of a further article 2 (see again FIG. 2) in a repeating cycle.

Figure 5:
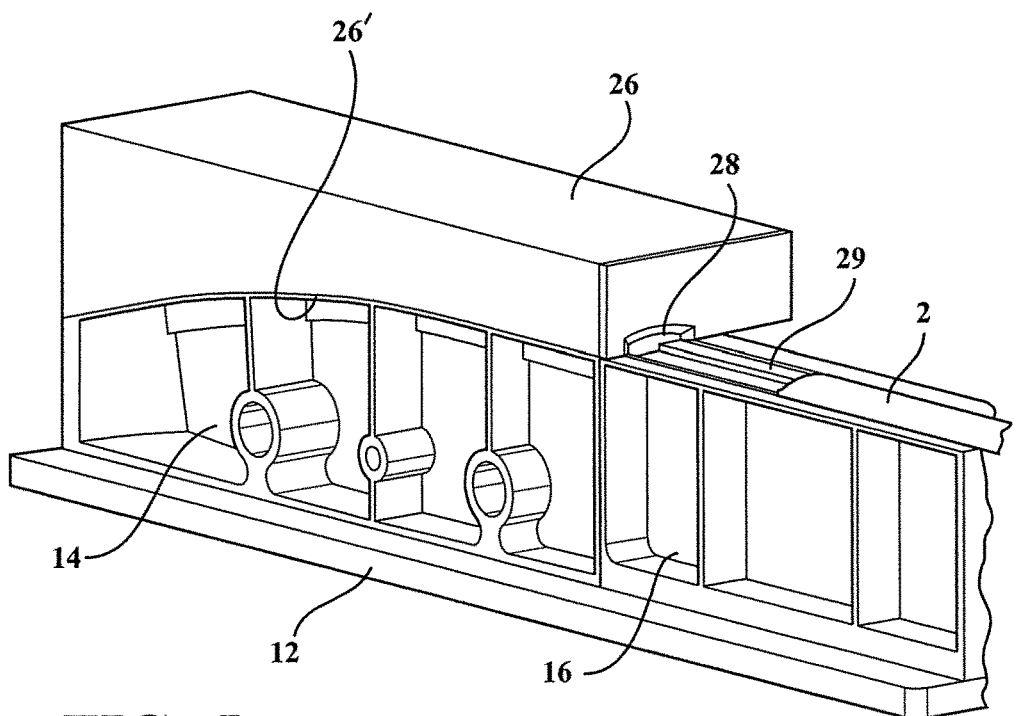
FIG. 5 is an example of a top attached end clamping fixture with underside defining cavity which can be affixed over the conforming surface of the main forming fixture in aligned and seating fashion such that the sandwiched extrusion is both guided and compressed into its end configured shape.

FIG. 5 is an example of a top attached end clamping fixture, see at 26 associated with selected main fixture supporting portion 14 (and such as which can be attached by any structure not limited to bolts, clamps or the like), the top clamping fixture defining a non-linear underside surface 26' which mates with the top surface of the fixture portion 14 and collectively exhibits an underside defining cavity, see further at 28. The combination of the top attached end clamping fixture 26 with the main supporting superstructure 14 of the selected jig or fixture is such that the top fixture can be affixed over the conforming surface of the main forming fixture in aligned and seating fashion, further such that the extrusion 2 is both guided and compressed into its end configured (e.g. arcuate, non-linear and/or multi-axial) shape.

For purposes of ease of illustration, the article 2 is shown outside of the top fixture 26 however it is understood that the article 2 is typically oriented in the manner depicted in FIG. 3, such that its underside C channel configuration shown in FIG. 2A is captured upon elongate protruding location 29 associated with the supporting locations 18 and 20 (see also FIG. 1), this prior to affixation of the top clamping fixture 26. The present invention also contemplates additional variants in which the article 2 can be pre-positioned, such as via the engaging fingers 22 and 24 or some variation thereof, following which the top cap or fixture 26 is installed and in order to forcibly guide the elongated article 2 (extrusion or other plasticized formed item) into the proper shape.

Figure 6:
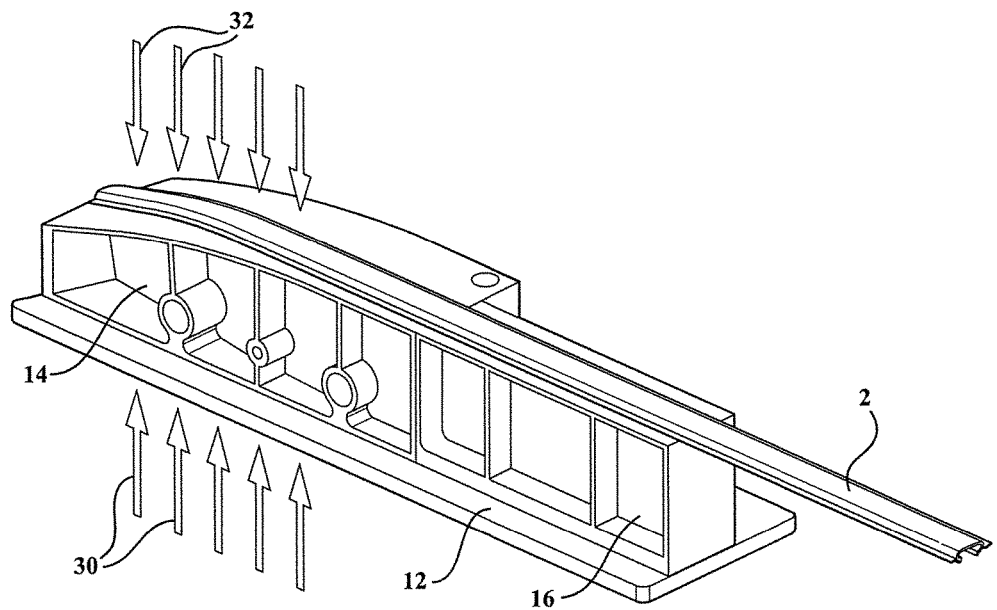
FIG. 6 is an illustration similar to that shown in FIG. 3 and exhibiting heated air patterns communicating in either an upward direction through the main fixture and/or downward from an above directed location.
Figure 7:
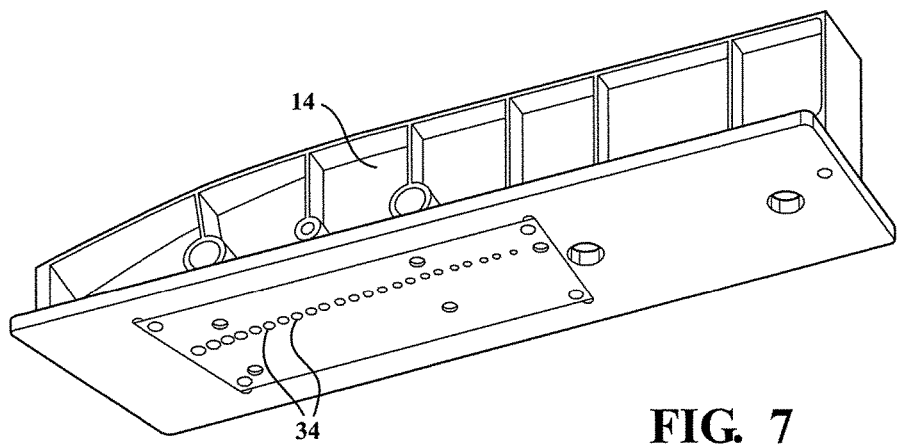
FIG. 7 is an underside rotated perspective of the main fixture in FIG. 6 and exhibiting inlet locations of airflow passages built into the base of the fixture to facilitate upward direction of heated airflows to the supported article.
Figure 8:
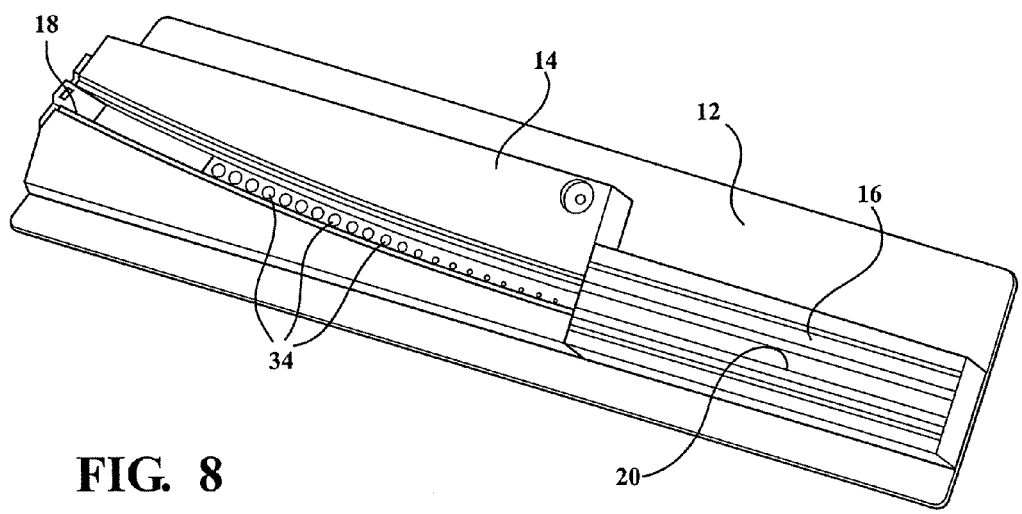
FIG. 8 is a further rotated top view of the fixture in FIG. 6 and illustrating the communication of the vertically ascending airflow passages directly to the underside channel surfaces of the lower supporting fixture and upon which is supported the bent extrusion article.

Proceeding to FIG. 6, an illustration similar to that shown in FIG. 3 is depicted and exhibits heated air patterns communicating in either an upward direction, see arrows 30, from below through the main fixture 14 and/or downward from an above, further arrows 32, the end supporting fixture 12. FIG. 7 is an underside rotated perspective of the main fixture in FIG. 6 and exhibiting inlet locations of airflow passages, at 34, built into the base 12 of the fixture 14 to facilitate upward direction of heated airflows in communicating fashion with the undersides of the conformed article 2, this resulting from the passageways 34 extending through the fixture 14 to the underside locations of the supporting channel 18. This is further shown in FIG. 8 which is a further rotated top view of the fixture in FIG. 6 and illustrating the communication of the vertically ascending airflow passages 34 directly to the underside channel surfaces 18 and 20 of the lower supporting fixture and upon which is supported the bent extrusion article 2.

Figure 9:
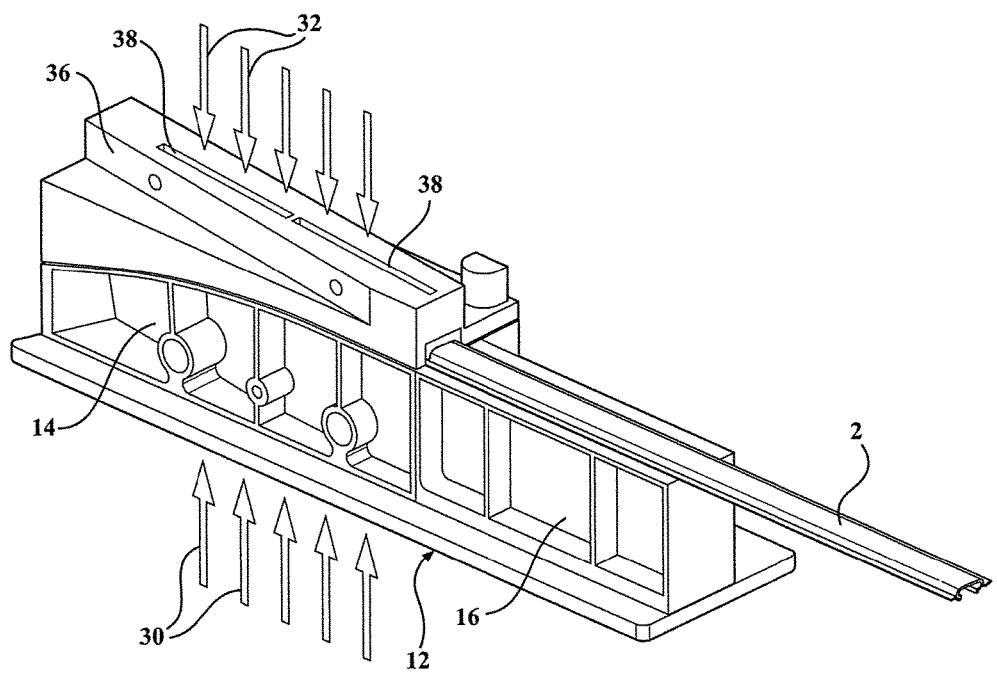
FIG. 9 illustrates a variation of a top cap or controlled diversion fixture, alternate to the version previously depicted in FIG. 5 and assembled over the main fixture, the assembly further illustrating additional passageways for delivering heated airflow patterns in a downwardly directed fashion through the top diversion fixture and into contact with such as a top surface of the elongated pre-extruded article.

FIG. 9 illustrates a variation of a top cap 36 which can be mounted atop the supporting fixture 14, alternate to the version of closed top cap 26 previously depicted in FIG. 5, however with the use of any similar arrangement of bolt fasteners, clamps or the like. Additional passageways are depicted in the top cap 36, these illustrated as linear recesses or channels 38 formed into the top cap 36, for delivering heated airflow patterns (again at 32) in a downwardly directed fashion through the top cap and into contact with such as a top surface of the elongated pre-extruded article 2.

Non-limiting variants of the invention contemplate the ability to provide a lower originating and upper directed heated airflow at up to several hundred degrees Fahrenheit in order to provide suitable softening of the fixture channel supporting portion of the article 2. A separate downwardly directed heated airflow can further be provided at any temperature not limited to any set range, however often in practicality including a lower delivery temperature which prevents marring of an upper decorative exposed surface of the article being re-shaped. Additional variants can envision a highly conductive covering material (such as again metal) which can extend over the article 2 and which can assist in providing the necessary heating and reshaping of the roof ditch.

Figure 10:
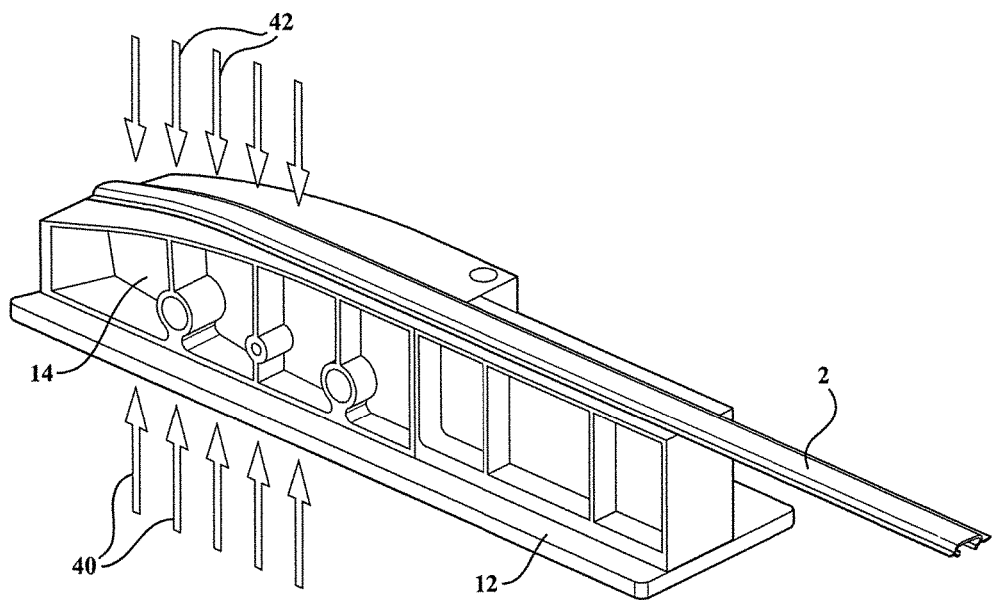
FIG. 10 is an illustration of a cooling step succeeding the heating step in FIG. 9, and in which ambient or cold air is delivered from either or both below and above the fixture and into contact with the pre-extruded and subsequently bent/reconfigured article.
Figure 11:
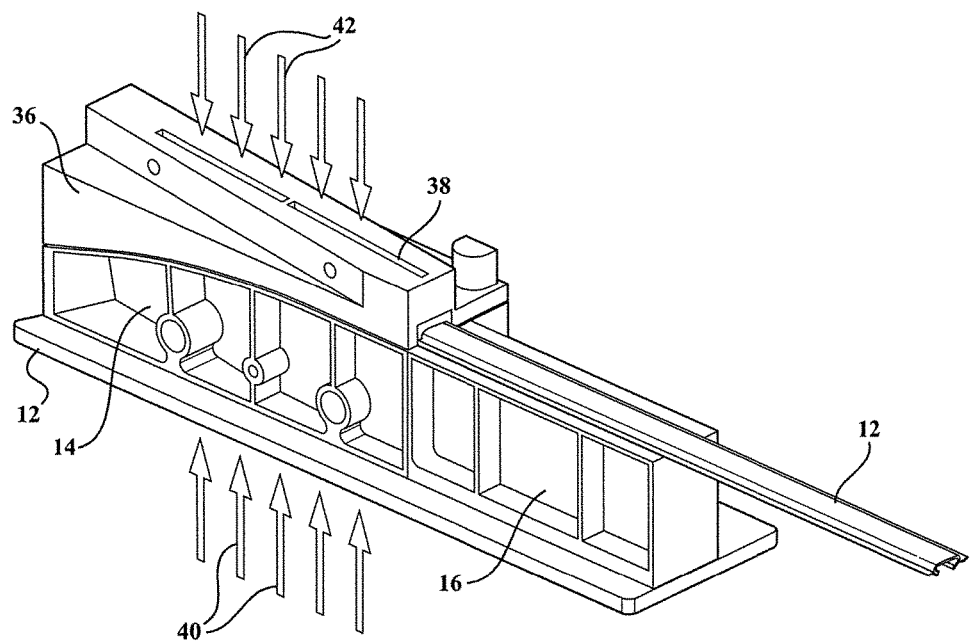
FIG. 11 is a similar cooling step succeeding the heating step of alternate FIG. 9 with ambient or cold air is delivered from either or both below and above the fixture and into contact with the pre-extruded and subsequently bent/reconfigured article.
Figure 12:
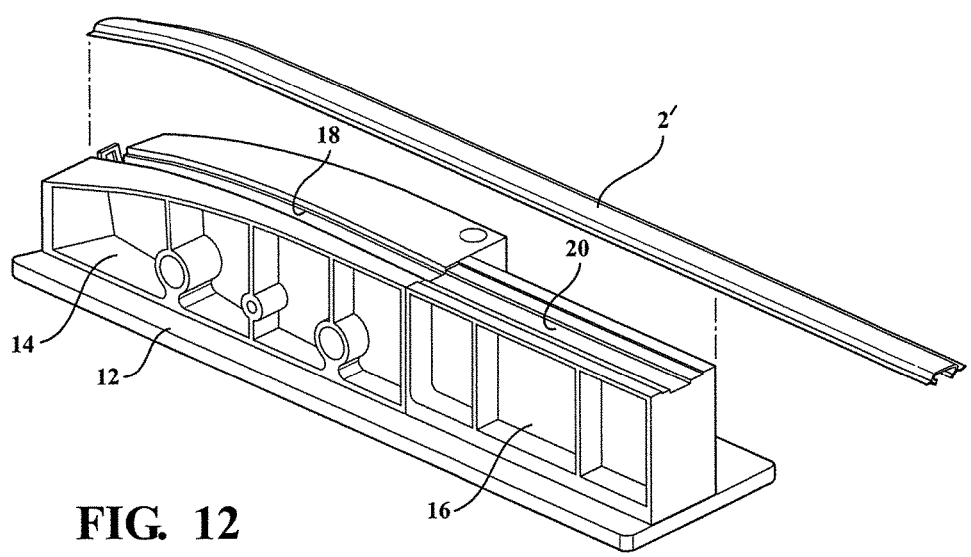
FIG. 12 is an illustration of the finished/bent part removed from the fixture.

FIG. 10 is an illustration of a cooling step succeeding the heating step in FIG. 9, and in which ambient or cold air is delivered from either or both below, at 40, and above, at 42, the fixture and into contact with the pre-extruded and subsequently bent/reconfigured article 2. FIG. 11 is a similar cooling step succeeding the heating step of alternate FIG. 9 with ambient or cold air is delivered from either or both below (again 40) the main underside supporting fixture 14, as well as above (again 42) and downwardly through the channel 38 formed into the top assembleable fixture or cap 36, and into contact with the pre-extruded and subsequently bent/reconfigured article 12, this in order to cool and set the plasticized article into its supported shape. Finally, FIG. 12 is an illustration of the finished/bent part 2' removed from the fixture and exhibiting the desired configuration as dictated by the support surface.

Figure 13:
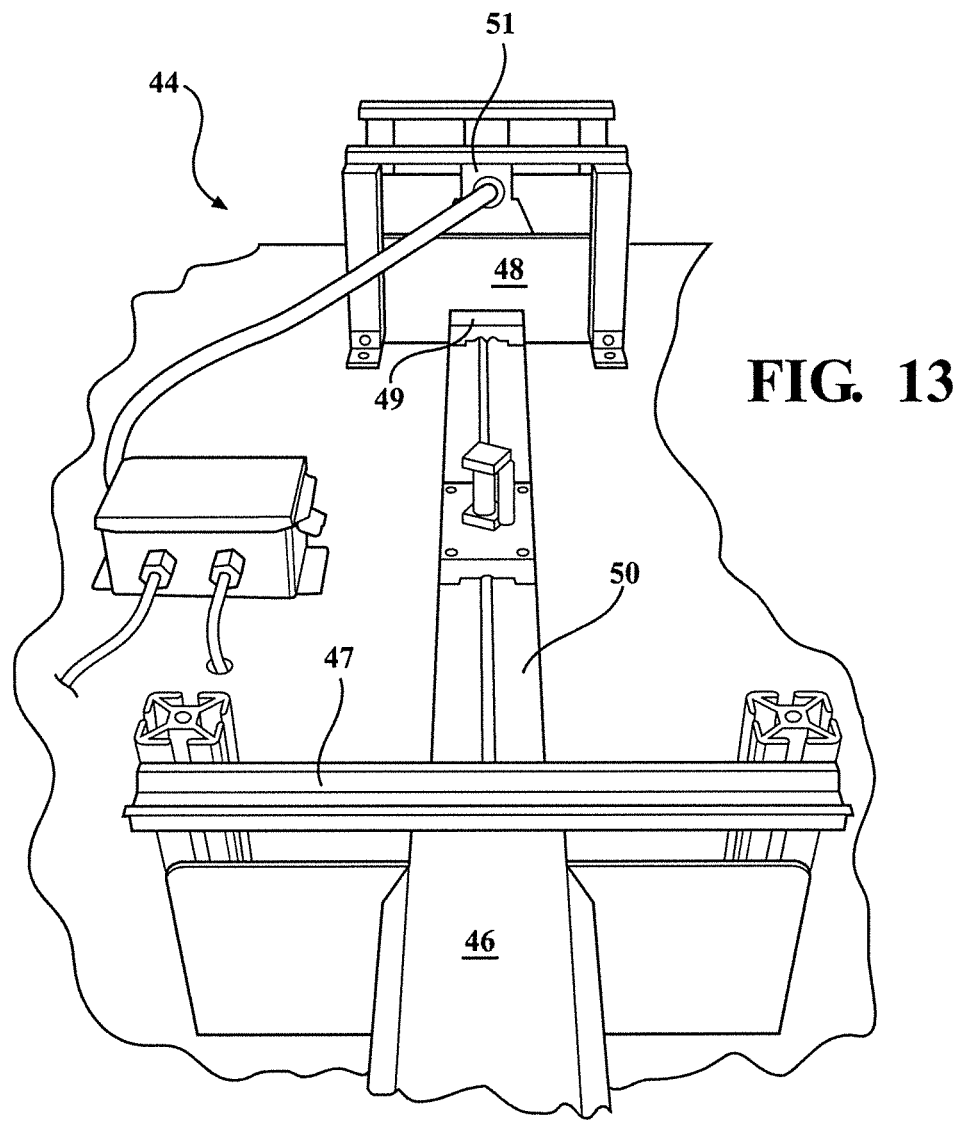
FIG. 13 is an operational illustration of a first pre-heating station associated with the present invention and illustrating, in end perspective, a selected heat generating component associated with such as an intermediate end extending location of a pre-extruded article.

Proceeding to FIG. 13, an operational illustration is provided of a first pre-heating station, generally at 44, associated with the present invention. The preheating station can include an elongated support surface 46, such as which can be constructed of a highly heat insulating material (such as a heavy duty nylon or other material) and upon which the elongated pre-extruded or otherwise pre-formed article is supported (not shown).

As best shown, an end location of the pre-heating station depicts a selected heat generating component 48, such as associated with an intermediate end extending location of a pre-extruded article, such as previously shown at 2, and which functions in order to soften an extending portion of the article corresponding to an area to be bent or otherwise re-shaped. The heat generating component can exhibit any construction for applying a necessary degree of heat to sufficiently pre-soften an extending range of the elongated article (in one variant the ends are not heated to allow for operator handling during transfer from the pre-heat station to the main bending fixture).

Also shown are other jigs or fixture components, see as represented by support 47 for the heating element and additional support 49 for supporting an elongated article (not shown in this illustration) upon an upper surface location 50 for seating and supporting the article during pre-heating, such as further accomplished through suitable electrical resistant heat input location such as at 51 associated with end supporting heating component 48. Without limitation, other heating inputs not limited to natural gas or the like can be substituted without departing from the scope of the invention. As further explained, preheating can be an optional step for facilitating the achieving of the final bending profile of the article and, in given instances, can be dispensed with or substituted by some other step or process for preparing the elongated article for reforming in the manner subsequently described.

Figure 14:
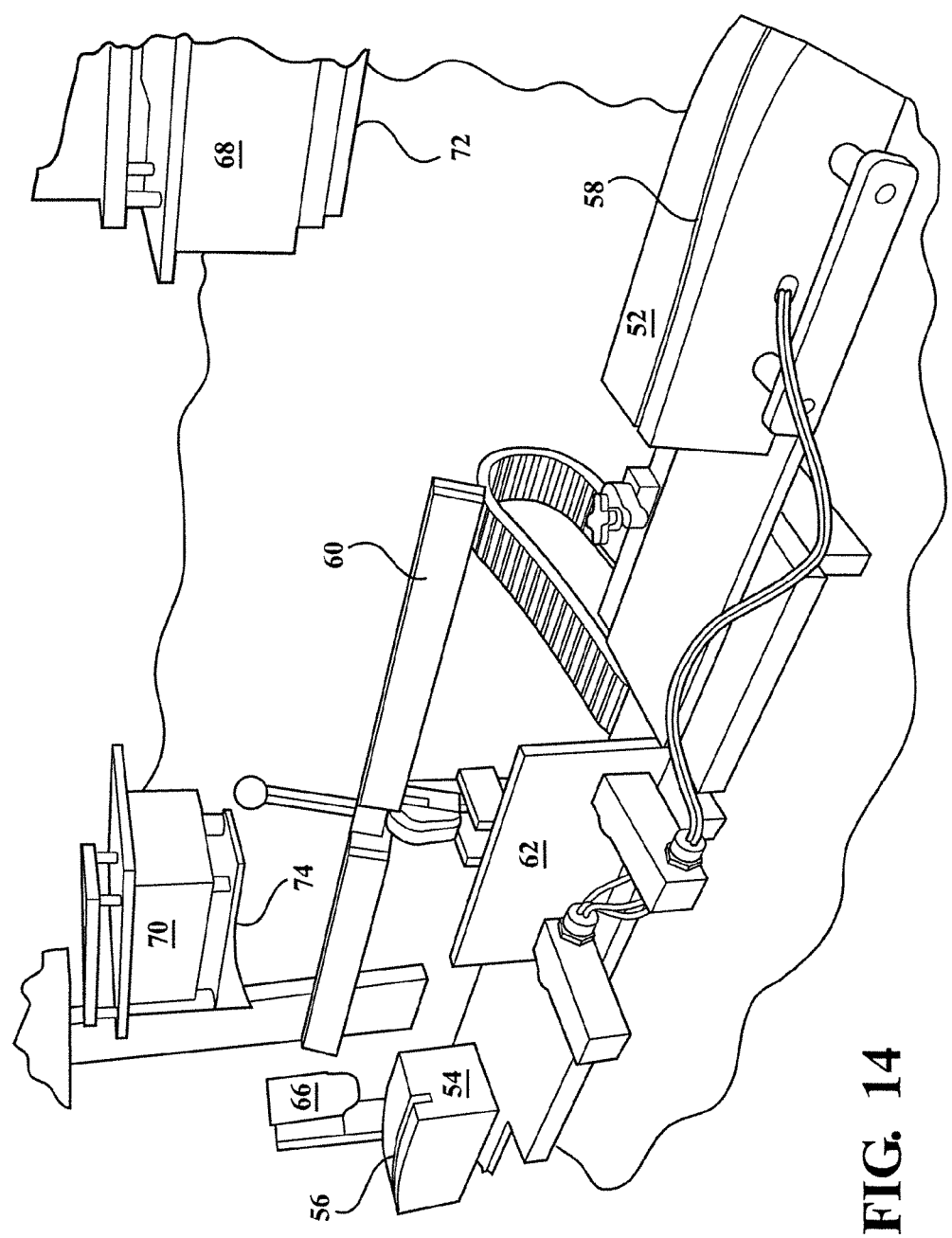
FIG. 14 is an operational illustration of the main bending fixture according to one non-limiting configuration and in an open and pre-loading position for accepting an elongated pre-extruded article, such as pre-heated as in FIGS. 13-14.

Proceeding to FIG. 14, an operational illustration is shown of the main bending fixture assembly according to one non-limiting configuration and in an open and pre-loading position for accepting an elongated pre-extruded article, such as pre-heated as in FIG. 13. As previously described, the main bending fixture can include first 52 and second 54 subset or wing separating fixtures (similar to those previously described) and which are configured along their upper surfaces, respectively at 56 and 58, to conform and bend associated end extending (and typically pre-heated or pre-softened) portions of the elongated article 2, these corresponding to end configurations such as which match a roof ditch vehicle well in one non-limiting application.

Figure 15:
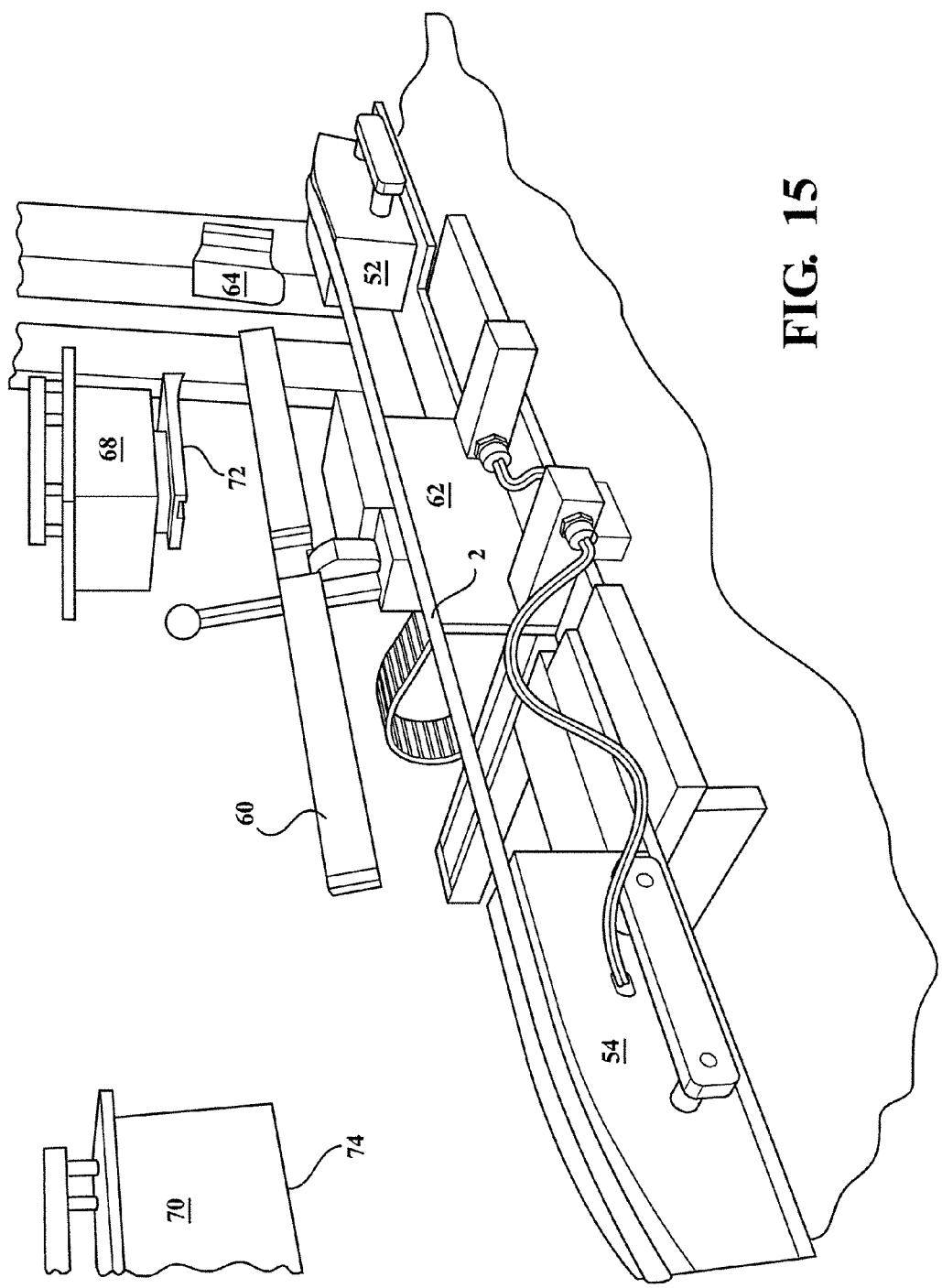
FIG. 15 is a succeeding illustration to FIG. 14 with the elongated pre-extruded (optionally pre-heated) article supported upon the main bending fixture and prior to loading by an upper rotating and elongated clamping portion.
Figure 16:
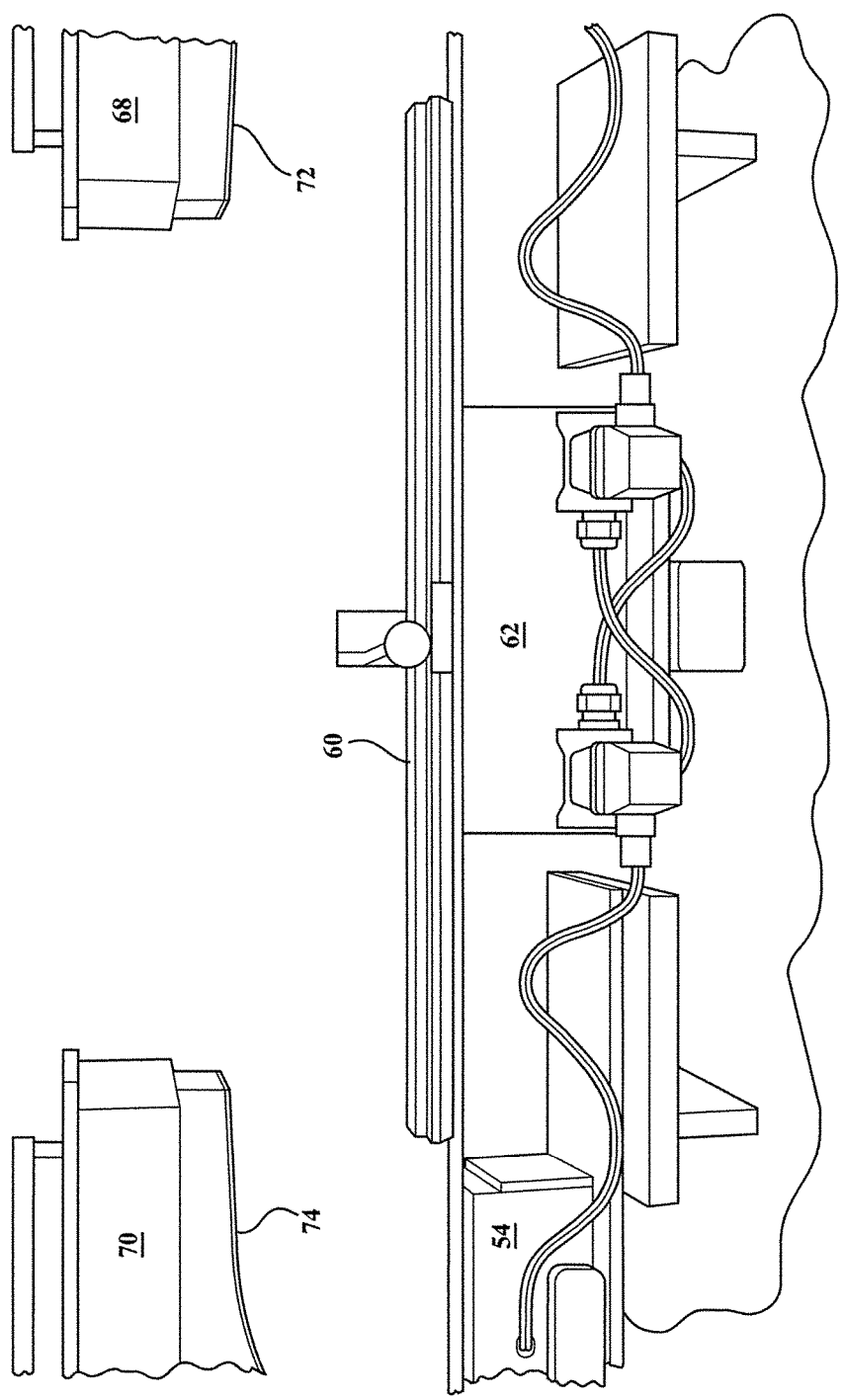
FIG. 16 is a succeeding illustration to FIG. 15 and depicting the extrusion in a loaded position with the upper rotating and elongated clamping portion brought into contact with an intermediate extending upper surface of the elongated article and further showing a pair of opposite end arrayed controlled diversion fixtures, these being located in the heating station and engageable with the upper surfaces of the elongated article after it is conformed/clamped to the fixture by way of the gripping fingers previously shown in FIG. 4 at a point previous to the heating station and such that, upon the diversion fixtures coming into contact with the elongated article and pressing it against the lower base or main fixture in order to conform associated extending ends of the extrusion along and against the (typically multi-dimensional) ramped surface of the main fixture, the main function of the diversion fixtures is to deliver heated air to the top of the article.
Figure 17:
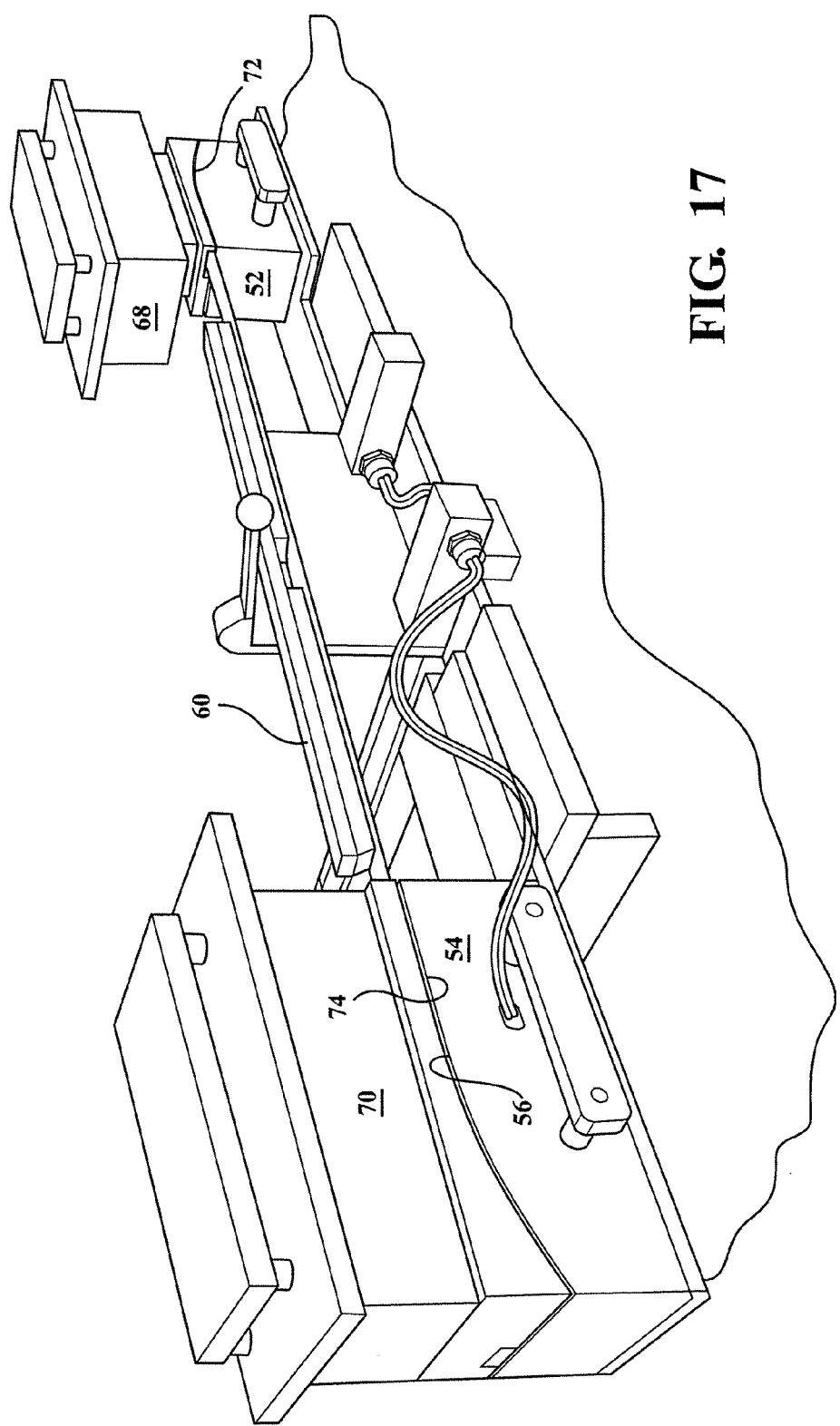
FIG. 17 is a succeeding illustration to FIG. 16 and depicting the controlled diversion fixtures brought into contact with the opposite end arranged main fixtures and for assisting in conforming the ends of the extruded article against the profile contours defined upon the upper surfaces of the fixtures concurrent with the delivery of heated air to facilitate reshaping of the article.

Also depicted in the non-limiting example of a main reshaping fixture assembly in FIG. 14 is the provision of an upper rotating and elongated clamping portion 60 which, as further shown in succeeding FIGS. 15-17, and which is configured with an elongated and pivotally displaceable support location in order to pivot between an upper release position (FIG. 15) and a downwardly rotated engaging position (FIG. 16-17) in order to sandwich an intermediate range of the article 2 placed upon the platform supporting surfaces of the assembly, such as upon a middle located platform 62 affixed to a horizontal support location of the assembly, with the extending opposite ends of the article 2 respectively being forced upon the guiding upper surfaces 56 and 58 of the end located fixtures 52 and 54. It is also envisioned that the rotatable center clamp 60 for engaging and sandwiching the central extending portion of the elongated article could be substituted by other structure, such as without limitation a linearly displaceable configuration. End clamps 64 (FIG. 14) and 66 (FIG. 14) can facilitate pre-holding of the ends of the article 2 concurrent with the loading stage, following which upper fixtures 68 and 70 associated with the assembly are actuated downwardly (such as in response to any numerically controlled servo operation) and in order to bring underside contoured surfaces 72 and 74, respectively, of the upper fixtures 68 and 70 into contact with the pinched or sandwiched ends of the elongated article 2 (not shown) and upon the same being positioned with its opposite ends in sandwiched confirming fashion against the profile contours defined upon the upper surfaces 56 and 58 of the fixtures 52 and 54.

Figure 19:
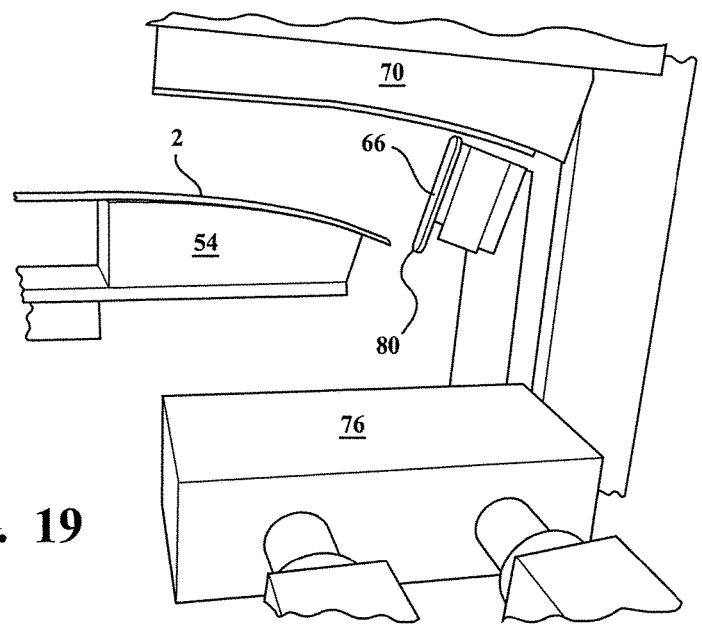
FIG. 19 is an opposite end illustrations of a second of the heat generating elements depicted in FIGS. 14-15.

FIG. 19 is a rear-side illustration of one non-limiting example of a heat generating element, at 76, associated with a selected end located main forming fixture 54, the heat generating element including a heated airflow delivery component of one non-limiting construction positioned underneath the selected and end proximate located fixture for assisting in shaping the profile of the pre-extruded article. Without limitation, any type of ceramic heating assembly or other construction can be provided according to what is known in the relevant art and which is able to deliver a heated airflow, such as in a range of upwards of several hundred degrees against at least a lower communicating surface of the elongated article. As further previously discussed, additional upper originating and downwardly directed heated airflows can also be incorporated into the assembly, such being provided at any suitable temperature range which may also be moderated to account for the exposed decorative surfaces of the article being produced.

Figure 18:
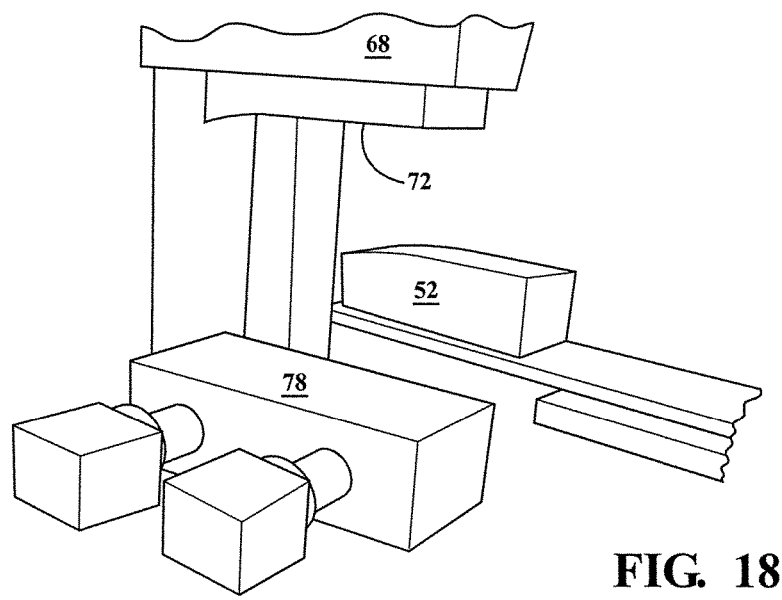
FIG. 18 is a partial illustration of one non-limiting example of a heat generating element associated with a selected end located main forming fixture and including a heated airflow delivery component positioned underneath the selected and end proximate located fixture for assisting in shaping the profile of the pre-extruded article.

FIG. 18 depicts an opposite end illustrations of a second 78 of the heat generating components, each of which providing necessary heated air generated input in at least one of upward or downward directed fashion against the sandwiched and reconfigured surfaces of the article 2 (see as previously described in reference to FIGS. 6-9). As previously described, a cooling step can be integrated into the process for cooling and setting (hardening) the reformed article 2, and reference is again made to the previous descriptions in FIGS. 10-12.

Following completed reshaping of the article, additionally steps include an incising or knife edge defining component 80 (see again FIG. 19), such as located proximate or otherwise associated with either or both of the end assisting holding clamps (see further at 66 as additionally shown in FIG. 14), the purpose for this being to section a predetermined excess extending length of the completely and finally formed ends of the article. Without limitation, the knife edge component can be actuated in any direction or fashion in order to section a remaining trailing edge of the elongate article following completed shaping. The use of the knife edge or end sectioning step accounts for the understanding that the material properties of the article are such that it may otherwise exhibit a dimensional variance resulting from the heating, shaping and cooling. With that in mind, it has been found that providing the article with a slightly longer length dimension and then clipping the excess ends as determined by the length profile associated with the forming surface is preferable.

Associate method steps for reshaping a previously formed and elongated thermoplastic plasticized article include each of applying the elongated article in an initially linear configuration to a pair of spaced apart fixtures, each exhibiting an upwardly configured and multi-dimensional extending support surface corresponding to a desired multi-dimensional profile associated with a finished and reshaped article. Additional steps include forcibly conforming the article from its linear configuration against the support surfaces, heating and subsequently softening the article in order to reshape and reform against the surfaces and cooling and solidifying of the article in its desired reshaped profile.

Other steps include preheating at least first and second ends of the elongated article prior to applying to the fixture support surface and applying top fixtures with conforming undersides engaging the support surfaces of the fixtures to sandwich the article therebetween. Yet additional steps include the forcible conforming of the ends of the article including grasping underside configured and extending end locations of the article.

The step of heating the article further includes generating and directing a heated airflow directly to a surface of the article, with the step of cooling the article further including introducing a downward cooling airflow upon at least an upper surface of the article.

The present invention further describes an associated process for re-forming or reshaping a previously formed (e.g. extruded) article, such utilizing any collection of the assembly structure or features described herein. Having described my invention, other and additional preferred embodiments will become apparent to those skilled in the art to which it pertains, and without deviating from the scope of the appended claims.

We claim:

1. A method for reshaping a previously formed and elongated thermoplastic plasticized article, the article having receiving edges, said method comprising the steps of:
    providing a fixture having an upper multi-dimensional extending support surface corresponding to a desired multi-dimensional profile associated with a finished and reshaped article;
    configuring a trough in length extending fashion along the upper support surface, a pair of recessed edge support surfaces within the trough adapted to engage the receiving edges of the article upon applying the elongated article in an initially linear configuration against the fixture;
    forcibly conforming the article from its linear configuration against the multi-dimensional support surface;
    heating and subsequently softening the article in order to reshape and reform against the multi-dimensional support surface; and
    cooling and solidifying of the article in its desired reshaped profile and prior to removing the article from the fixture.

2. The method as described in claim 1, further comprising the step of preheating at least first and second ends of the elongated article prior to applying to the fixture support surface.

3. The method as described in claim 1, said step of forcibly conforming the article further comprising applying upper mating fixtures with conforming undersides engaging the support surfaces of the fixtures to sandwich the article therebetween.

4. The method as described in claim 3, the receiving edges of the article further including inwardly facing and side recess locations, said step of forcibly conforming the article further comprising grasping the side recess locations which communicate with the receiving edges of the article.

5. The method as described in claim 2, said step of heating the article further comprising generating and directing a heated airflow directly to a surface of the article.

6. The method as described in claim 1, said step of cooling the article further comprising introducing a downward cooling airflow upon at least the upper support surface of the article.

7. The method as described in claim 1, said step of providing a fixture further comprising a pair of spaced apart fixtures adapted to support opposite end extending portions of the article, each of said fixture exhibiting the upwardly configured and multi-dimensional extending support surface and corresponding the desired multi-dimensional profile associated with opposite ends of the finished and reshaped article.

8. The method as described in claim 4, said step of grasping the side recess locations of the article further comprising configuring gripping fingers extending upwardly within the trough, the gripping fingers each including opposite and outwardly facing ledge locations for engaging said pair of recessed edge support surfaces which interfaces between the side recess locations and receiving edges of the article underside.

9. The method as described in claim 5, said step of heating the article further comprising configuring airflow passageways into the fixture between said trough in communication with the upper surface and a bottom surface of the fixture.

10. The method as described in claim 9, further comprising the steps of applying top fixtures with conforming undersides engaging the support surfaces of the fixtures to sandwich the article therebetween and of configuring additional airflow passageways through the top fixtures in communication with the airflow passageways in said fixture.

* * * * *